United States Patent [19]
Crabb et al.

[11] Patent Number: 5,396,512
[45] Date of Patent: Mar. 7, 1995

[54] PORT TRANSCEIVER FOR PROVIDING COMMUNICATION BETWEEN A SIGNAL TRANSMITTING AND RECEIVING MACHINE AND A SPACE SWITCH

[75] Inventors: Thomas B. Crabb, Grass Valley; Charles S. Meyer, Nevada City, both of Calif.

[73] Assignee: Nvision, Inc., Nevada City, Calif.

[21] Appl. No.: 48,733

[22] Filed: Apr. 16, 1993

[51] Int. Cl.$^6$ .................. H04B 3/00; H04L 25/00
[52] U.S. Cl. .................. 375/257; 375/219; 340/825.03
[58] Field of Search .......... 340/825.03, 825.79; 370/32, 60.1; 375/7, 36; 333/124

[56] References Cited

U.S. PATENT DOCUMENTS 4,736,394  4/1988  Giovannelli et al. ............... 375/36
5,088,112  2/1992  Pyhte,uml/a/ lammi et al. ... 375/36

Primary Examiner—Michael Horabik
Attorney, Agent, or Firm—Smith-Hill and Bedell

[57] ABSTRACT

A switcher has a plurality of input ports and a plurality of output ports. A plurality of port transceivers each have first and second I/O ports, an input port connected to an output port of the switcher and an output port connected to an input port of the switcher. Each port transceiver provides a first input signal path from the first I/O port to the output port of the transceiver, a second input signal path from the second I/O port to the output port of the transceiver, a first output signal path from the input port of the transceiver to the first I/O port, and a second output signal path from the input port of the transceiver to the second I/O port. Each port transceiver has a first state in which it propagates a signal received at its input port to its second I/O port and a signal received at its first I/O port to its output port and the first output signal path presents a high impedance to the first I/O port, and a second state in which it propagates a signal received at its input port to its first I/O port and a signal received at its second I/O port to its output port and the second output signal path presents a high impedance to the second I/O port.

14 Claims, 4 Drawing Sheets

CONTROLLING

CONTROLLED

PORT TRANSCEIVER FOR PROVIDING COMMUNICATION BETWEEN A SIGNAL TRANSMITTING AND RECEIVING MACHINE AND A SPACE SWITCH

BACKGROUND OF THE INVENTION

This invention relates to a port transceiver for providing communication between a signal transmitting and receiving machine and a space switch.

In a television production facility, there may be a large number of machines of various types, such as editors and video tape recorders (VTRS). Normally, control messages are distributed among the machines separately from the audio and video information. As shown in FIG. 1, each machine 10A and 10B includes a balanced driver 12 and a differential receiver 14. The balanced driver 12 receives encoded control messages and provides a balanced digital data signal in accordance with the Electronic Industries Association Recommended Standard 422, or RS-422, and the differential receiver 14 receives an RS-422 signal that is decoded into control messages. A female nine-pin D connector 18 at the back panel of the machine has pins 2, 7, 3 and 8 connected to a change-over switch 17. In a first (controlling) state of the machine, the switch 17 connects the two output terminals of the balanced driver to pins 3 and 8 of the connector 18 and connects the two input terminals of the differential receiver to pins 2 and 7 of the connector, whereas in a second (controlled) state the connections are reversed. FIG. 1 shows machine 10A in the controlling state and machine 10B in the controlled state. The two machines are connected together by a cable 20 having male D connectors at its two opposite ends respectively. In this fashion, as shown in FIG. 1, the driver 12 of each machine is connected to the receiver 14 of the other machine. The controlling machine is normally a source machine, i.e. a machine that provides machine control messages in the form of commands, and the controlled machine is a destination machine, i.e. a machine that provides machine control messages in the form of status information. For example, the controlling machine, such as an editor, might instruct the controlled machine, such as a VTR, to enter the recording state, whereupon the controlled machine informs the controlling machine that it is in the recording state, and the controlling machine provides audio and video data to the controlled machine to be recorded thereby.

In order to facilitate connection of a source (controlling) machine to multiple destination (controlled) machines, for example for duplicating from the source machine to the destination machines, each machine may also be provided with a second female D connector 24, as shown in FIG. 2, connected pin-to-pin with the connector 18. The second female D connector 24 is known as connector 0, to distinguish from the connector 18, which is known as connector 1. Connector 1 of the source machine 10A is connected to connector 1 of a first destination machine 10B, connector 0 of the first destination machine is connected to connector 1 of a second destination machine 10C, and so on in daisy chain fashion. Thus, the driver of the source machine is connected to the receivers of each of the destination machines and the drivers of the destination machines are connected to the receiver of the source machine. In effect, the cables and the loop-through connections provide a command bus to which the driver of the controlling machine and the receivers of the controlled machines are connected, and a status bus to which the receiver of the controlling machine and the drivers of the controlled machines are connected. Through a further connection (not shown) the drivers of all the destination machines except the last one in the daisy chain may be disabled, so that only the last destination machine provides status information to the source machine. The drivers that are disabled are placed in a high impedance state, so that their presence does not degrade the characteristics of the signal path from the driver of the last destination machine to the receiver of the source machine.

If cables are used to interconnect the machines, as described above, and the arrangement of the machines is to be changed, the cables have to be swapped and reconnected to establish the new arrangement. This is a time-consuming and error-prone operation.

In order to allow an ensemble of machines to be connected in a flexible fashion in different groups, without need to swap cables whenever a change is desired, the machines may be connected to digital routing switcher 26 having inputs connected to pins 3 and 8 of each female connector and outputs connected to pins 2 and 7 of each female connector, as shown in FIG. 3. In this case, the outputs of each driver are connected to pins 3 and 8 and the inputs of each receiver are connected to pins 2 and 7. In order to connect machine 10A as controlling machine to machines 10B and 10C as controlled machines, for example, crosspoints 30 and 34 are closed to provide the command path and crosspoint 40 or 44 is closed to provide the status path.

A conventional digital routing switcher is composed of row conductors connected to switcher inputs, column conductors connected to switcher outputs, and crosspoint elements for connecting any row conductor with any column conductor. If the crosspoint element for connecting row i with column j is enabled, it asserts a logic high or logic low at output j, depending on the state of input i. If the crosspoint element is not enabled, it does not assert a logic level at output j. However, the crosspoint element does not present a high impedance to output j. Accordingly, the arrangement shown in FIG. 3 is subject to disadvantage because it allows the driver of one machine to be connected through the switcher to the driver of another machine. In the case of the example described above, the driver of the machine 10C is connected through crosspoints 48 and 49 to the driver of machine 10A, even though neither crosspoint 48 nor crosspoint 49 is enabled. Therefore, if the driver of machine 10C outputs a status message, it is delivered not only to the receiver of machine 10A, by way of crosspoint 40, but also to the driver of machine 10A. The resulting signal contention may cause the drivers to cease operation.

A further disadvantage of the arrangement shown in FIG. 3 is that in order to provide full connectivity for Q machines, each having both a connector 1 and a connector 0, $64 \times Q^2$ crosspoints are devoted to the interconnections of the drivers and receivers.

SUMMARY OF THE INVENTION

In accordance with the first aspect of the invention there is provided a transceiver having first and second I/O ports for connection to a signal transmitting and receiving machine, an input port and an output port, and comprising a first receiver having an input connected to said first I/O port and an output connected to said output port of the transceiver, a second receiver having an input connected to the second I/O port and an output connected to the output port of the transceiver, a first driver having an input connected to the input port of the transceiver and an output connected to the first I/O port, and a second driver having an input connected to the input port of the transceiver and an output connected to the second I/O port, said first and second drivers and said first and second receivers each being controllable so that in a first state of the transceiver the first driver is disabled and presents a high impedance to the first I/O port of the transceiver and the second driver and the first receiver propagate signals from the first I/O port of the transceiver to the output port thereof and from the input port of the transceiver to the second I/O port, and in a second state of the transceiver the second driver is disabled and presents a high impedance to the second I/O port of the transceiver and the first driver and the second receiver propagate signals from the second I/O port of the transceiver to the output port thereof and from the input port of the transceiver to the first I/O port.

In accordance with a second aspect of the invention there is provided a switcher having a plurality of input ports and a plurality of output ports and comprising a plurality of port transceivers each having first and second I/O ports, an input port connected to an output port of the switcher and an output port connected to an input port of the switcher, each port transceiver comprising means providing a first input signal path from the first I/O port to the output port of the transceiver, means providing a second input signal path from the second I/O port to the output port of the transceiver, means providing a first output signal path from the input port of the transceiver to the first I/O port, and means providing a second output signal path from the input port of the transceiver to the second I/O port, and each port transceiver having a first state in which it propagates a signal received at its input port to its second I/O port and a signal received at its first I/O port to its output port and the first output signal path presents a high impedance to the first I/O port, and a second state in which it propagates a signal received at its input port to its first I/O port and a signal received at its second I/O port to its output port and the second output signal path presents a high impedance to the second I/O port.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
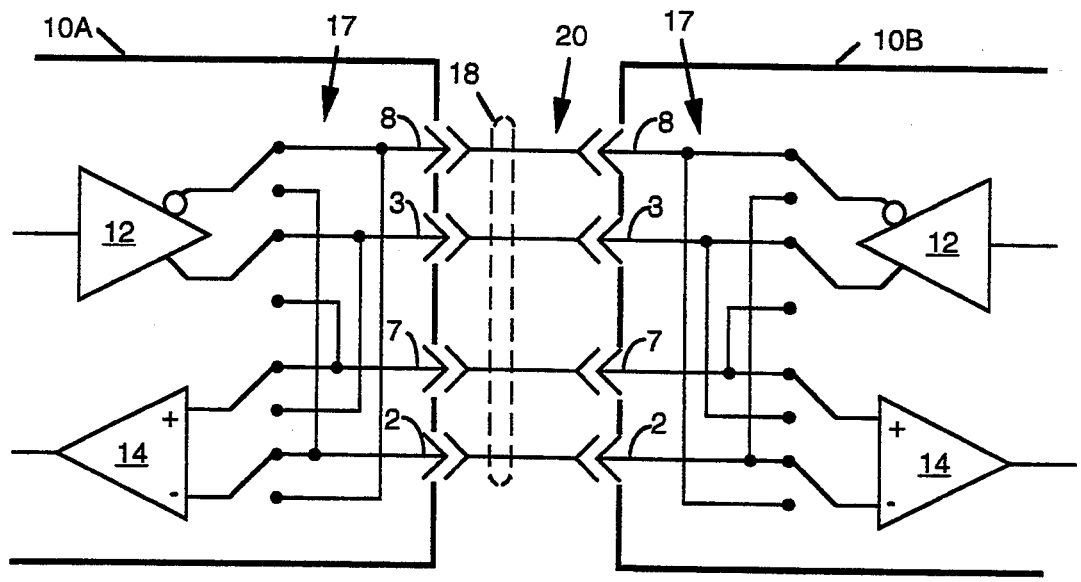
FIG. 1 illustrates schematically the connections of a controlling machine to a single controlled machine.
Figure 2:
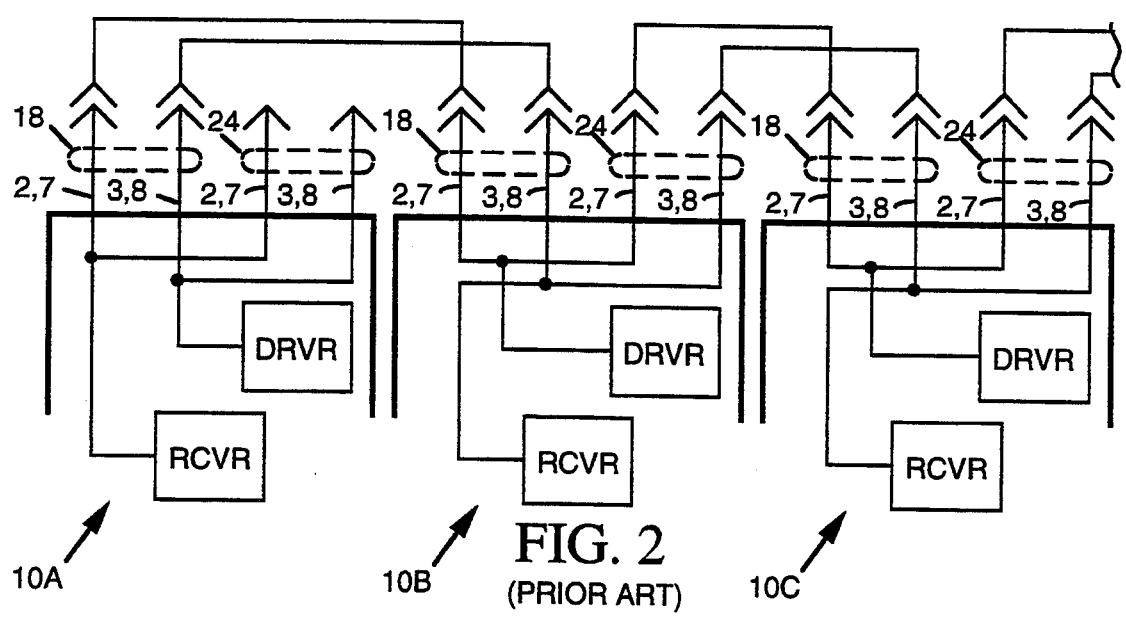
FIG. 2 illustrates in simplified form the connections between a controlling machine and multiple controlled machines.
Figure 3:
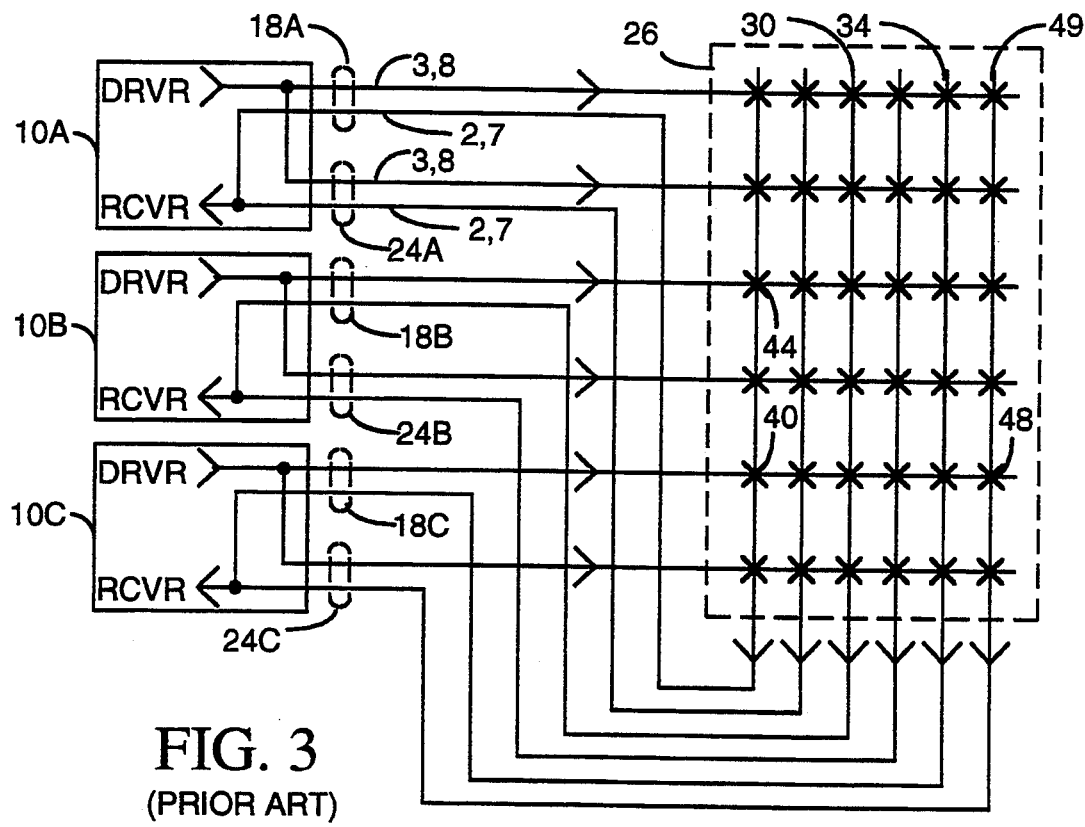
FIG. 3 illustrates an ensemble of machines connected to a routing switcher.
Figure 4:
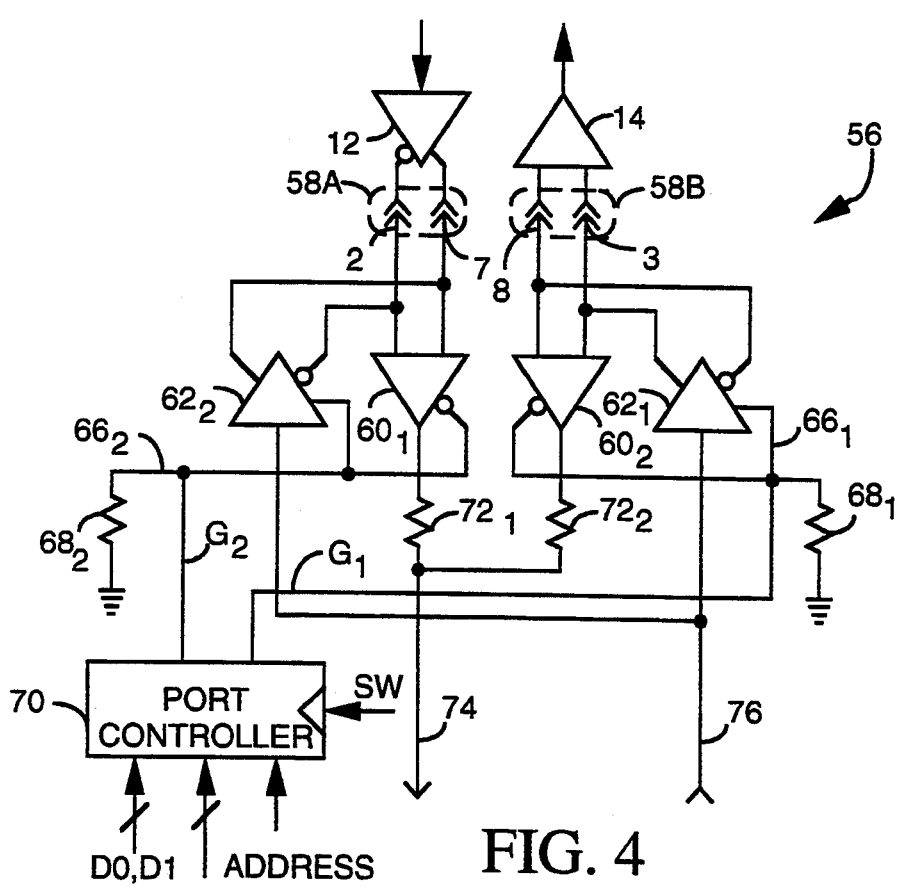
FIG. 4 is a schematic illustration of a port transceiver in accordance with the present invention.

The port transceiver 56 illustrated in FIG. 4 has two I/O ports 58A, 58B comprising, respectively, pins 2 and 7 and pins 3 and 8 of a standard female nine-pin D connector. The other pins of the connector are not illustrated in FIG. 4. When a standard RS 422 cable is used to connect connector 1 of a controlled machine to the connectors 58A, 58B, the machine's change-over switch (not shown) connects the port 58A to the machine's driver 12 and port 58B to the machine's receiver 14, as shown in FIG. 4. When the machine is configured as a controlling machine, port 58A is connected to the machine's receiver 14 and port 58B is connected to the machine's driver 12.

Pins 2 and 7 of the D connector are connected to the input terminals of a differential receiver $60_1$ and the output terminals of a balanced driver $62_2$. In similar fashion, pins 3 and 8 are connected to the input terminals of a differential receiver $60_2$ and the output terminals of a balanced driver $62_1$. The differential receiver $60_2$ has a negated control terminal that is connected to a node $66_1$, which is also connected to a control terminal of the balanced driver $60_2$. The node $66_1$ is connected to one output $G_1$ of a port controller 70, and is also connected through a pull-down resistor $68_1$ to ground. Due to the action of the pull-down resistor $68_1$, the node $66_1$ is high when the output $G_1$ is at logic high and low when the output $G_1$ is high impedance or at logic low. The differential receiver $60_1$ and balanced driver $62_2$ are connected in similar fashion to a pull-down resistor $68_2$ and a second output $G_2$ of the port controller 70.

The output terminals of the differential receivers $60_1$ and $60_2$ are connected through build-out resistors $72_1$ and $72_2$ respectively to an output terminal 74 of the port transceiver, whereas an input terminal 76 of the port transceiver is connected to the input terminals of the balanced drivers $62_1$ and $62_2$.

The outputs $G_1$ and $G_2$ of the port controller 70 can each be either logic high or logic low, but the port controller does not allow both outputs to be logic high. When both outputs $G_1$ and $G_2$ of the controller 70 are at logic low, the differential receivers 60 are enabled and the balanced drivers 62 are in a high impedance state. In this state, which is referred to as the off state, there is a possibility of the outputs of the two receivers 60 being in contention, but the build-out resistors 72 dissipate the contention. The two balanced drivers $62_1$ and $62_2$ present a high impedance to the ports $58_B$ and $58_A$ respectively.

When the output $G_1$ is at logic high and the output $G_2$ is at logic low, the differential receiver $60_1$ is enabled, the balanced driver $62_1$ is on, the differential receiver $60_2$ is disabled and the balanced driver $62_2$ is high impedance. In this state, which is referred to as the controlling state, the differential receiver $60_1$ converts a differential signal received at pins 2 and 7 to single-ended form and applies the resulting signal to the output terminal 74 of the port transceiver. Similarly, a single-ended signal received at the input terminal 76 of the port transceiver is converted to differential form by the balanced driver $62_1$ and is applied to pins 3 and 8. The balanced driver $62_2$ presents a high impedance to the I/O port $58_A$ of the port transceiver. In the controlling state, the port transceiver functions as a controlling machine.

In the controlled state of the port transceiver, the controller output $G_1$ is placed at logic low and the output $G_2$ is placed at logic high. In this state, in which the differential receiver $60_1$ is disabled, the balanced driver $62_1$ is high impedance, the differential receiver $60_2$ is enabled and the balanced driver $62_2$ is on, the port transceiver functions as a controlled machine. A single-ended signal received at the input terminal 76 is converted to balanced form by the balanced driver $62_2$ and is applied to pins 2 and 7 of the port 58, whereas a balanced signal received at pins 3 and 8 of the port is converted to single-ended form by the differential receiver $60_2$ and is delivered to the output terminal 74 of the transceiver. The balanced driver $62_1$ presents a high impedance to pins 3 and 8 of the port 58.

Figure 5A:
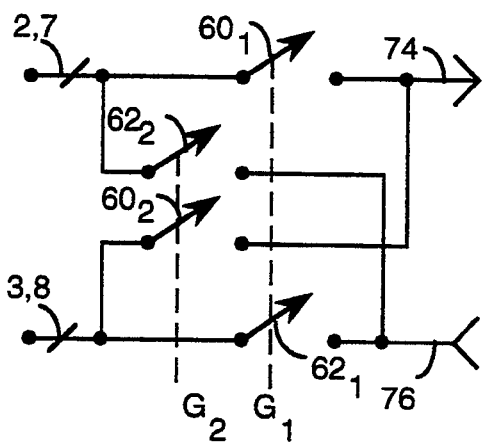
FIGS. 5A, 5B and 5C illustrate schematically respective states of the port transceiver shown in FIG. 4.
Figure 5B:
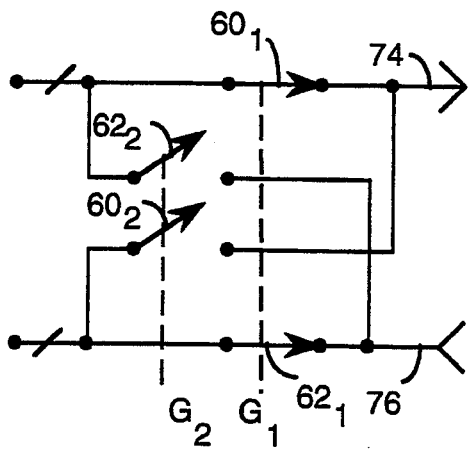
Figure 5C:
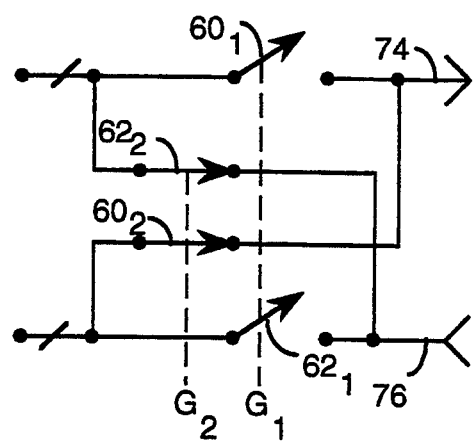

The three permitted states of the port transceiver are represented schematically in FIGS. 5A (off), 5B (controlling) and 5C (controlled) respectively.

Figure 6:
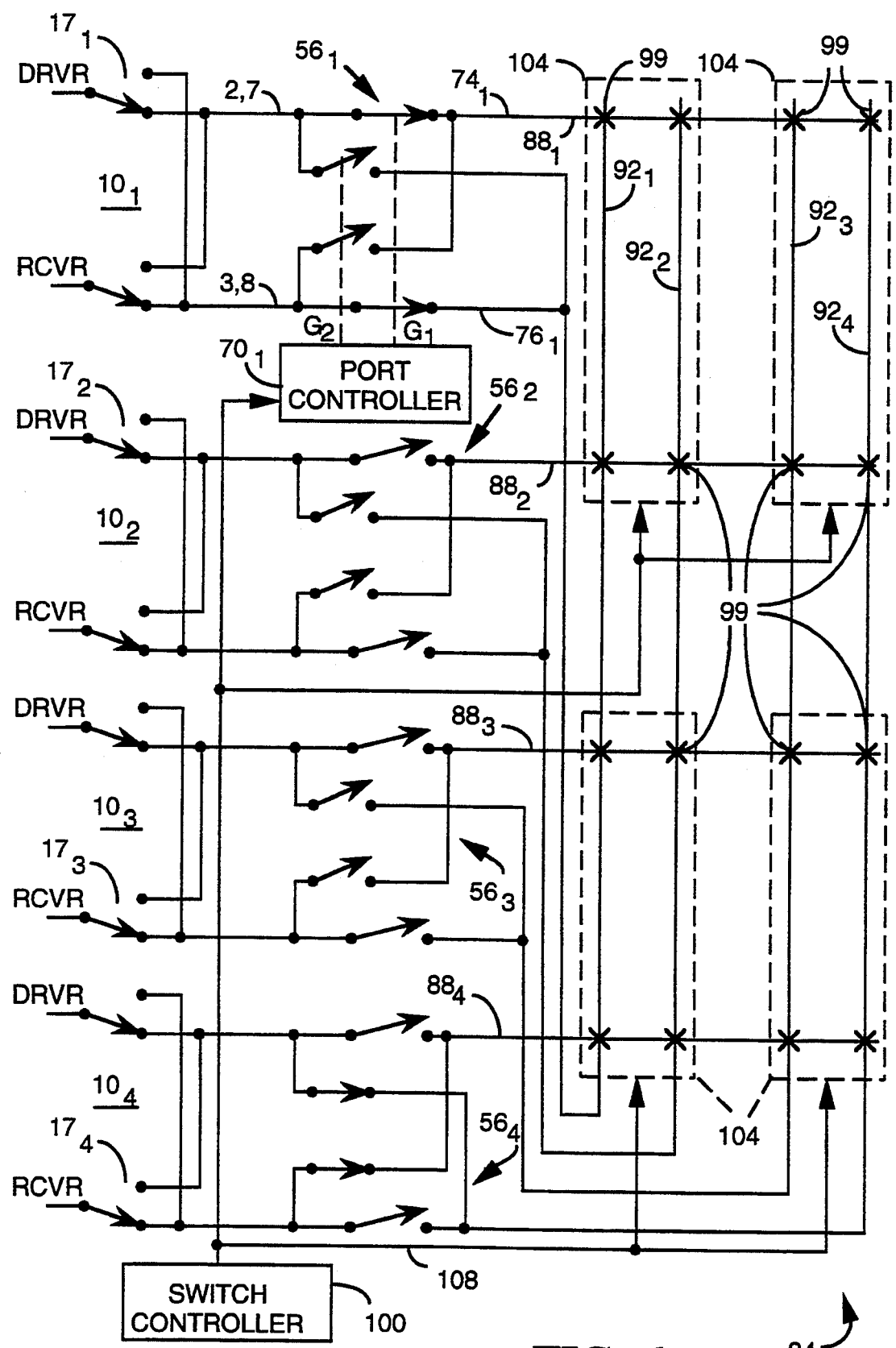
FIG. 6 illustrates an ensemble of machines connected to a routing switcher equipped with port transceivers in accordance with the invention.

FIG. 6 illustrates a routing switcher 84 in simplified form. The routing switcher may be as disclosed in co-pending U.S. patent application Ser. No. 08/007,060 filed Jan. 21, 1993 as a continuation of patent application Ser. No. 07/614,230 filed Nov. 15, 1990 now abandoned, and co-pending patent application Ser. No. 08/026,439 filed Mar. 4, 1993, the disclosure of each of which is hereby incorporated by reference herein. The switcher comprises N row (or input) conductors 88, N column (or output) conductors 92, and an array of $N \times N$ crosspoints 96 for connecting each combination of a row conductor and a column conductor. Each crosspoint can be identified uniquely by an address having a vertical component (i) and a horizontal component (j). All crosspoints on a given row conductor have the same horizontal address component, and similarly all crosspoints on a given column conductor have the same vertical address component. As shown in FIG. 6, the switcher is composed of a rectangular array of switch modules 104 and each switch module itself comprises an $n \times n$ array of crosspoints. (As illustrated, n is equal to two but in a practical implementation n would normally be considerably greater than two.) The switcher also comprises a switch controller 100 for controlling the configuration of the switcher. The switch controller maintains a map of the configuration of the switcher, i.e., the state of each crosspoint. The switch controller 100 periodically (typically during each vertical interval of an associated video signal) places configuration data defining the map on a control bus 108, which is distributed to the switch modules. The configuration data for a given crosspoint is a vector in the form (i,j,X) where the components i and j identify the crosspoint for connecting row i and column j and X represents the state of the crosspoint. Each switch module 104 includes a module controller (not shown) that recognizes the addresses of the crosspoints in that module and loads the corresponding state values. In this manner, each switch module is periodically refreshed with the proper state of all the crosspoints in the module. When a change in configuration of the switcher is to take place, the switch controller updates the configuration map and placed the updated configuration data on the control bus. The switch controller issues a switch-take signal over the control bus, and in response to that signal the switch modules change to the configuration defined by the new configuration data.

FIG. 6 also shows N port transceivers 56 with each port transceiver $56_i$ having its input terminal $76_i$ connected to the column conductor $92_i$ and its output terminal $74_i$ connected to the row conductor $88_i$. Each port transceiver $56_i$ is connected by a standard RS-422 cable to connector 1 of a machine $10_i$. Each machine $10_i$ includes a change-over switch $17_i$ for selectively placing the machine in the controlled state or the controlling state. The control bus 108 is distributed not only to the different switch modules that form the switcher, as described above, but is also distributed to the port controllers, only one of which, namely the port controller $70_1$, is shown in FIG. 6.

In order to define fully a particular interconnection established by the switcher, it is necessary to specify a single controlling machine and at least one controlled machine. The switch controller receives a command that specifies the controlling machine and the controlled machines and calculates the addresses of the crosspoints that connect the output of the controlling machine's port transceiver to the input of each controlled machine's port transceiver. If, for example, machine $10_1$ is specified as the controlled machine and machine $10_4$ is specified as the controlling machine, the switch controller calculates the address (4,1). This address identifies the crosspoint that provides the forward or command path from the machine $10_4$ to the machine $10_1$. The switch controller also calculates the address of the crosspoint that is diagonally opposite that which was calculated in response to the command, i.e. the address (1,4). The latter address identifies the crosspoint that provides the reverse or status path from the machine $10_1$ to the machine $10_4$. Based on the address (4,1) the switch controller 84 issues transceiver control data to place transceiver $56_1$ in the controlling state and transceiver $56_4$ in the controlled state. The transceiver control data is in the form (i,D0,D1). The combination (D0,D1) is interpreted by the port controllers as indicating whether the port transceiver $56_i$ is controlling, controlled or off. Thus, the combination (1,0) indicates that the transceiver is controlling, the combination (0,1) indicates that the transceiver is controlled, and the combination (0,0) indicates that the transceiver is off.

Each port controller functions as an addressable decoder and examines the transceiver control data. In the case of the example, the switch controller issues transceiver control data (1,1,0) and (4,0,1) for transceivers $56_1$ and $56_4$ and issues control data (i,0,0) for the other transceivers. The port controller $70_1$ examines the data (1,1,0) and reads the data values D0=1 and D1=0. In response to a write enable signal, the port controller $70_1$ loads these values for D0 and D1. This combination (1,0) indicates that the port transceiver $56_1$ should be placed in the controlling state. Similarly, the port controller of transceiver $56_4$ loads the combination (0,1) and the other port controllers load the combination (0,0). In response to the switch-take signal, the port controller $70_1$ places the port transceiver $56_1$ in the controlling state, and similarly the port transceiver $56_4$ is placed in the controlled state and all other port transceivers are turned off (D0=0, D1=0).

If it is subsequently desired to change the configuration of the switcher, for example to connect the machine $10_3$ as controlling machine to the machines $10_1$ and $10_2$ as controlled machines, the switch controller receives commands that identify the addresses (3,1) and (3,2) and calculates the addresses (1,3) and (2,3). In order to avoid contention on the return path, it is necessary that only one of the controlled machines be a responding machine, and if no responding machine is specified to the switch controller, the switch controller selects one of the specified controlled machines by default. For example, the switch controller might select the machine $10_2$ (the highest-numbered controlled machine) as the responding machine. Assuming that the machine $10_2$ is the responding machine, the switch controller issues configuration data (3,1,1), (3,2,1), (1,3,0) and (2,3,1) for the crosspoints (3,1), (3,2), (1,3), and (2,3), and configuration data (i,j,0) for the other crosspoints. The module controllers interpret this data as indicating that the crosspoints (3,1), (3,2) and (2,3) should be enabled and that the other crosspoints should be disabled. The switch controller also issues configuration control data (1,1,0), (2,1,0), (3,0,1) and (4,0,0). The port controller of transceiver $56_3$ loads data values (0,1), indicating that it is to be in the controlled state, and similarly the port controllers of transceivers $56_1$ and $56_2$ each load data values (1,0) respectively, indicating that the transceivers are in the controlling state. The port controller of the transceiver $56_4$ loads data values (0,0). In response to the next switch-take signal, the transceiver $56_3$ is placed in the controlled state, the transceivers $56_1$ and $56_2$ are placed in the controlling state and the transceiver $56_3$ is turned off. Since the crosspoint (1,3) is disabled, status messages issued by machine $10_1$ are not sent to machine $10_3$ and therefore there is no signal contention at the output of the receiver of machine $10_3$.

Since the port transceivers convert balanced input signals to single-ended form and back again, they allow the routing switcher to operate with single-ended signals, requiring less connections than if balanced signals were employed. In particular, in order to provide full connectivity for Q machines, only $Q^2$ crosspoints are required for the interconnections of the drivers and receivers.

It will be appreciated that the invention is not restricted to the particular embodiment that has been described, and that variations may be made therein without departing from the scope of the invention as defined in the appended claims and equivalents thereof. For example, it is not necessary that the port controller function be distributed among the port transceivers, since by use of two additional switcher outputs for each port transceiver, the values of $G_1$ and $G_2$ may be delivered directly to each port transceiver from the switch controller.

We claim:

1. A transceiver having first and second I/O ports for connection to a signal transmitting and receiving machine, an input port and an output port, and comprising a first receiver having an input connected to said first I/O port and an output connected to said output port of the transceiver, a second receiver having an input connected to the second I/O port and an output connected to the output port of the transceiver, a first driver having an input connected to the input port of the transceiver and an output connected to the first I/O port, and a second driver having an input connected to the input port of the transceiver and an output connected to the second I/0 port, the transceiver having a first state in which the first driver is disabled and presents a high impedance to the first I/O port of the transceiver and the second driver and the first receiver propagate signals from the first I/O port of the transceiver to the output port thereof and from the input port of the transceiver to the second I/O port, and a second state in which the second driver is disabled and presents a high impedance to the second I/O port of the transceiver and the first driver and the second receiver propagate signals from the second I/O port of the transceiver to the output port thereof and from the input port of the transceiver to the first I/O port.

2. A transceiver according to claim 1, wherein the transceiver has a third state in which the first and second drivers are disabled and present a high impedance to the first and second I/O ports respectively.

3. A transceiver according to claim 2, wherein in the first state of the transceiver the first receiver is enabled and the second receiver is disabled, in the second state the second receiver is enabled and the first receiver is disabled, and in the third state the first and second receivers are enabled.

4. A transceiver according to claim 3, wherein the transceiver further comprises first and second resistors connected between the first and second receivers and the output port for dissipating output contention.

5. A transceiver according to claim 2, further comprising a transceiver controller having a first output connected to control inputs of the first driver and first receiver and a second output connected to control inputs of the second driver and second receiver, the first and second outputs of the controller defining the first, second and third states of the transceiver.

6. A transceiver according to claim 1, wherein the first and second I/O ports each have two terminals, the first and second drivers are balanced drivers for receiving single-ended signals from the input port of the transceiver and providing balanced signals to the first and second I/O ports respectively, and the first and second receivers are differential receivers for receiving balanced signals from the first and second I/O ports respectively and providing single-ended signals to the output port of the transceiver.

7. A switcher having a plurality of input ports and a plurality of output ports and comprising a plurality of port transceivers each having first and second I/O ports, an input port connected to an output port of the switcher and an output port connected to an input port of the switcher, each port transceiver comprising means providing a first input signal path from the first I/O port to the output port of the transceiver, means providing a second input signal path from the second I/O port to the output port of the transceiver, means providing a first output signal path from the input port of the transceiver to the first I/O port, and means providing a second output signal path from the input port of the transceiver to the second I/O port, and each port transceiver having a first state in which it propagates a signal received at its input port to its second I/O port and a signal received at its first I/O port to its output port and the first output signal path presents a high impedance to the first I/O port, and a second state in which it propagates a signal received at its input port to its first I/O port and a signal received at its second I/O port to its output port and the second output signal path presents a high impedance to the second I/O port.

8. A switcher according to claim 7, wherein each port transceiver has a third state in which the first and second output signal paths present a high impedance to the first and second I/O ports respectively.

9. A switcher according to claim 7, comprising control means for connecting any single input port of the switcher to any set of output ports of the switcher and for controlling the port transceivers such that the state of each port transceiver depends on the connections established by the control means.

10. A transceiver according to claim 1, further comprising a transceiver controller having a first output connected to control inputs of the first driver and first receiver and a second output connected to control inputs of the second driver and second receiver, the first and second outputs of the controller defining the first and second states of the transceiver.

11. Apparatus comprising:

n signal transmitting and receiving machines each having first and second I/O ports and comprising a driver for providing output signals, a receiver for receiving input signals, and a change-over switch having a first state in which the driver is connected to the first I/O port and the receiver is connected to the second I/0 port and a second state in which the driver is connected to the second I/0 port and the receiver is connected to the first I/0 port, n port transceivers each having first and second I/0 ports, an input port and an output port, the ith port transceiver having its first I/0 port connected to the first I/0 port of the ith machine and its second I/0 port connected to the second I/0 port of the ith machine, and each port transceiver comprising means providing a first input signal path from the first I/0 port of the transceiver to the output port of the transceiver, means providing a second input signal path from the second I/0 port of the transceiver to the output port of the transceiver, means providing a first output signal path from the input port of the transceiver to the first I/0 port of the transceiver, and means providing a second output signal path from the input port of the transceiver to the second I/0 port of the transceiver, and each port transceiver having a first state in which it propagates a signal received at its input port to its second I/O port and a signal received at its first I/O port to its output port and the first output signal path presents a high impedance to the first I/0 port, and a second state in which it propagates a signal received at its input port to its first I/O port and a signal received at its second I/O port to its output port and the second output signal path presents a high impedance to the second I/O port, and a switcher having n input ports and n output ports, the ith input port of the switcher being connected to the output port of the ith port transceiver and ith output port of the switcher being connected to the input port of the ith port transceiver, and the switcher comprising means for connecting the ith input port of the switcher to any set of output ports of the switcher selected from the group that comprises at least the output ports other than the ith output port.

12. Apparatus according to claim 11, wherein each port transceiver has a third state in which the first and second output signal paths present a high impedance to the first and second I/O ports respectively.

13. Apparatus according to claim 11, comprising control means to which the switcher is responsive for connecting the ith input port of the switcher to any set of output ports of the switcher selected from the group that comprises at least the output ports other than the ith output port, and wherein the port transceivers are responsive to the control means such that the state of each port transceiver depends on the connections established by the control means.

14. Apparatus according to claim 11, wherein the group of output ports of the switcher comprises all output ports of the switcher.

* * * * *